United States Patent
Rotgans

(10) Patent No.: US 6,466,159 B1
(45) Date of Patent: Oct. 15, 2002

(54) TARGET DETECTION ARRANGEMENT

(75) Inventor: Petrus Johannes Rotgans, Hengelo (NL)

(73) Assignee: Thales Nederland B.V., Hengelo (NL)

( * ) Notice: Subject to any disclaimer, the term of this patent is extended or adjusted under 35 U.S.C. 154(b) by 0 days.

(21) Appl. No.: 09/600,179

(22) PCT Filed: Feb. 2, 1999

(86) PCT No.: PCT/EP99/00661

§ 371 (c)(1),
(2), (4) Date: Aug. 4, 2000

(87) PCT Pub. No.: WO99/41622

PCT Pub. Date: Aug. 19, 1999

(30) Foreign Application Priority Data

Nov. 2, 1998 (NL) .............................. 1008276

(51) Int. Cl.[7] .......................... G01S 13/52; G01S 17/00
(52) U.S. Cl. .......................... 342/160; 342/27; 342/28; 342/52; 342/54; 342/118; 342/128; 342/131; 342/132; 342/134; 342/159; 342/175; 356/3; 356/4.01

(58) Field of Search ........................... 342/27, 28, 104, 342/105, 115, 118, 127–136, 159–164, 175, 192, 193–197, 147–158, 52, 53, 54, 22; 356/3, 4.01, 5.01

(56) References Cited

U.S. PATENT DOCUMENTS 5,822,047 A * 10/1998 Contarino et al. ......... 356/5.01

OTHER PUBLICATIONS

L. J. Mullen et al, "Application of RADAR Technology to Aerial LIDAR Systems for Enhancement of Shallow Underwater Target Detection," IEEE Transactions on Microwave Theory; (vol. 43, No. 9; pp. 2370–2377; Sep. 1995).*

* cited by examiner

Primary Examiner—Bernarr E. Gregory
(74) Attorney, Agent, or Firm—Oblon, Spivak, McClellend, Maier & Neustadt, P.C.

(57) ABSTRACT

Radar apparatus in which output RF signals are modulated on an optical signal prior to transmission. Incoming optical echo signals are converted into RF signals using a detector. The original functionality of the radar apparatus is to a large extend retained, including the Doppler processing. The target radar cross section is determined by the wavelength of the optical signal.

7 Claims, 2 Drawing Sheets

TARGET DETECTION ARRANGEMENT

The invention relates to a detection arrangement for the remote detection of targets, comprising a radar signal generator for generating coded RF radar signals, a transmitter unit controlled by the coded RF radar signals, a radar receiver unit and a video processor connected to the radar receiver unit.

A detection arrangement of this type implemented as a radar apparatus is known in many versions. The drawback of a radar apparatus is that the emitted RF waves can be easily detected by means of ESM receivers which reveal the location and usually also the identity of the transmitting object. Besides, once detected, the radar apparatus may be subjected to deliberate interference.

The present invention obviates this drawback and is characterized in that the transmitter unit is designed to transmit optical signals modulated by the coded RF radar signals and that an optical detector is positioned in front of the radar receiver unit for converting echo signals from the transmitted optical signals into coded RF radar signals, possibly containing target information.

The optical signal consequently acts as carrier for the RF radar signals and the original functionality of the radar apparatus is to a large extent retained.

An advantageous embodiment of the invention, which obviates the necessity of using coherent optical signals is characterized in that the transmitter unit is designed for the amplitude modulation of the optical signals.

An incidental advantage of this embodiment is that the optical detector can be implemented as a relatively low-cost envelope detector.

A detection arrangement according to the invention is eminently suitable for Doppler processing, in which it is not the Doppler shift of the optical signals that is utilized, but the Doppler shift of the coded RF radar signals. A further fact is that a target's radar cross-section is mainly determined by the wavelength of the optical signals. This provides an additional degree of freedom; if, for instance, the dispersion of a gas cloud is to be followed, the RF frequency should be selected such that a good Doppler processing is ensured and optical signals that provide a good reflection on the gas cloud.

A further advantageous embodiment of the invention is characterized in that the signal generator is designed to generate pulse bursts. The use of pulse bursts in radar is well-known, just like the fact that this yields an optimal Doppler processing. The disadvantage of radar is that a burst can easily be jammed by a repeater jammer, which does not apply to the detection arrangement according to the invention, because optical repeater jammers are not available.

A further advantageous embodiment of the invention, which makes optimal use of the pulse bursts, is characterized in that the video processor includes a Doppler processor of the moving target indication (MTI) or moving target detection (MTD) type to enable the detection of moving targets.

A further advantageous embodiment of the invention is characterized in that the signal generator is designed to generate FMCW radar signals and that the receiver comprises a mixer stage for combining the echo signals detected by the optical detector with signals generated by the signal generator. The detection arrangement will then incorporate all the advantages normally inherent in an FMCW radar apparatus, but is virtually undetectable. Besides, the problem involving the isolation between the transmitter unit and the receiver unit can be solved more easily, because the actual radar beam is then generated by means of optical components.

A further advantageous embodiment of the invention is characterized in that the optical detector incorporates at least two optical diodes for producing RF monopulse signals and that the radar receiver unit is a monopulse receiver. Thus, the direction of a target can be determined on the basis of the phase or amplitude difference between the RF radar signals. In this embodiment, with two diodes disposed in the horizontal plane, the invention can be used to advantage as a collision avoidance radar for vehicles.

A further advantageous embodiment of the invention is characterized in that the optical detector incorporates four optical diodes for producing an RF sum signal, an RF Δ-azimuth difference signal and an RF Δ-elevation difference signal. In this embodiment, the detection arrangement is equivalent to a monopulse fire control radar well-known in the art, on the understanding that the arrangement is now capable of tracking an aircraft without the aircraft's lock-on warning system being activated.

A further advantageous embodiment of the invention is characterized in that the detection arrangement is designed for underwater applications. This is feasible because a wavelength of the optical signals can be chosen such that a good penetration depth can be attained. This makes it possible to detect the approach of, for instance, torpedoes on the basis of their Doppler velocity. Mounted underneath a helicopter for instance, the detection arrangement would make it possible to locate objects below the water surface and, for instance, to track a submarine on the basis of its Doppler velocity.

As the general radar equation is in fact relevant to the detection arrangement according to the invention, an increase of the effective range can be realized by either increasing the transmitted power or by enhancing the receiver unit sensitivity. An advantageous embodiment of the invention is characterized in that a light amplifier is positioned in front of the optical detector so that the transmitted power can be kept at a relatively low level.

BRIEF DESCRIPTION OF THE DRAWINGS

The invention will now be described in greater detail with reference to the following figures, of which.

DETAILED DESCRIPTION OF THE INVENTION

Figure 1:
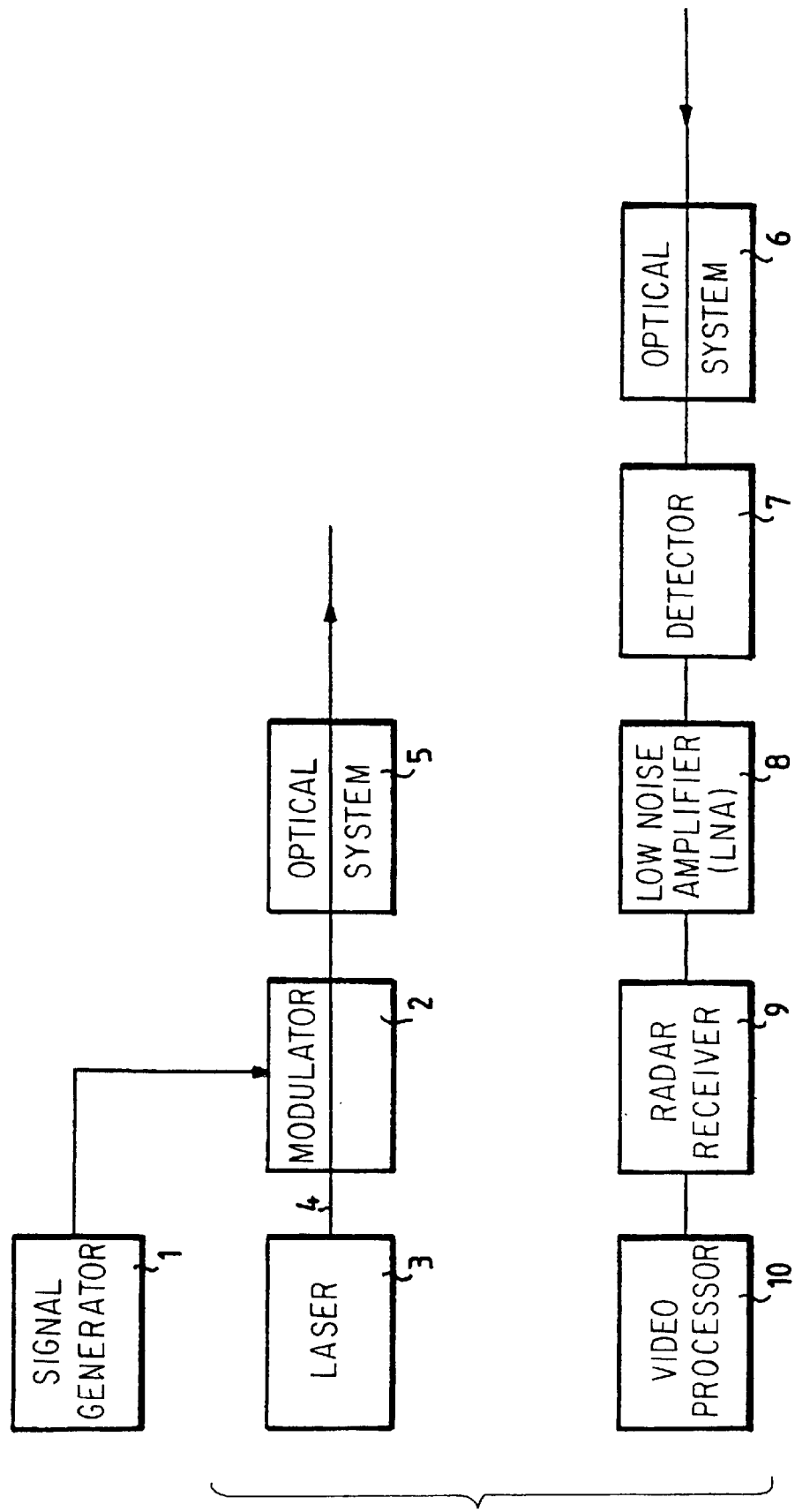
FIG. 1 represents a detection arrangement according to the invention.

FIG. 1 shows a block diagram of a detection arrangement according to the invention. A signal generator 1 which, as is usually the case with MTI radar, is provided with a COHO and STALO (not shown) and a timing, generates an RF signal suitable for transmission via a power amplifier and an antenna. The RF signal may be a pulse pattern transmitted with a fixed or staggered PRF, the individual pulses possibly provided with a modulation that enables pulse compression. According to the invention, this RF signal is applied to a modulator 2 which amplitude-modulates a light beam 4 generated by a laser 3. Light beam 4 is via an optical system 5 transmitted in the direction of a target to be detected. Modulator 2 may be a Bragg cell, well-known in the field of optics, while for laser 3 a $CO_2$ laser may be used. Instead of a separate modulator, it is also possible to opt in favour of a laser that can be modulated directly by means of the RF signal, for instance a solid-state laser. An alternative possibility when using radar pulses is to pulse laser 3 too, such that laser 3 is always active when a radar pulse is emitted.

The properties of the detection arrangement described with reference to FIG. 1 are dependent on the selection of the RF signal, the laser wavelength and the properties of the optical system 5. The RF signal determines the general radar properties, such as foldback in range and Doppler and Doppler resolution. The laser wavelength determines a target's reflectivity and the transmission properties of the medium to be penetrated. The properties of the optical system 5 determine the beam's divergence and shape. Thus, for instance, a fan beam, which is commonly used with search radars, can be realized by means of an elliptical lens. Optical system 5 may also be empty, which results in a beam of minimum divergence, suitable for the detection of small-size targets at relatively long ranges. Generally speaking, the dimensions of optical system 5 are far smaller than the dimensions of an antenna that realizes a comparable beam, because these dimensions are related to the wavelength of the radiation to be emitted.

The receiver chain of the above-mentioned embodiment comprises an optical system 6 for focusing incoming optical reflections on to a detector 7. The RF output signal of detector 7 is applied to a radar receiver 9, preferably via an LNA 8, as is usual in radar engineering. In this radar receiver, incoming RF signals are, using the STALO signal, mixed down to an intermediate frequency, subsequently filtered and, along with the COHO signal serving as reference signal, applied to a quadrature detector to produce quadrature video, this being the standard procedure in MTI radar. Detector 7 may be an $H_gC_dT_c$ detector suitable for application in combination with a $CO_2$ laser.

The output of radar receiver 9 is connected to a video processor 10 which, dependent on the type of RF signal used to modulate light beam 4, may incorporate a canceller or FFT processor. The output signal of video processor 10 is suitable for activating a display or for being applied to an automatic track unit for further processing.

FIG. 1 may also serve to clarify the operating principle of a detection arrangement of the FMCW type. In such an arrangement, signal generator 1 generates an RF signal of the FMCW type, well-known in the art, which signal is used to modulate light beam 4 by means of modulator 2. Detector 7 converts incoming optical reflections into RF echo signals which are amplified by means of LNA 8 and which are subsequently applied to radar receiver 9, implemented as a mixer stage in which the RF echo signals are combined with the output signal of signal generator 1, all this in a manner well-known in the art. Radar receiver 9 is connected to a video processor 10 which will generally incorporate an FFT processor for the supply of range information.

Figure 2:
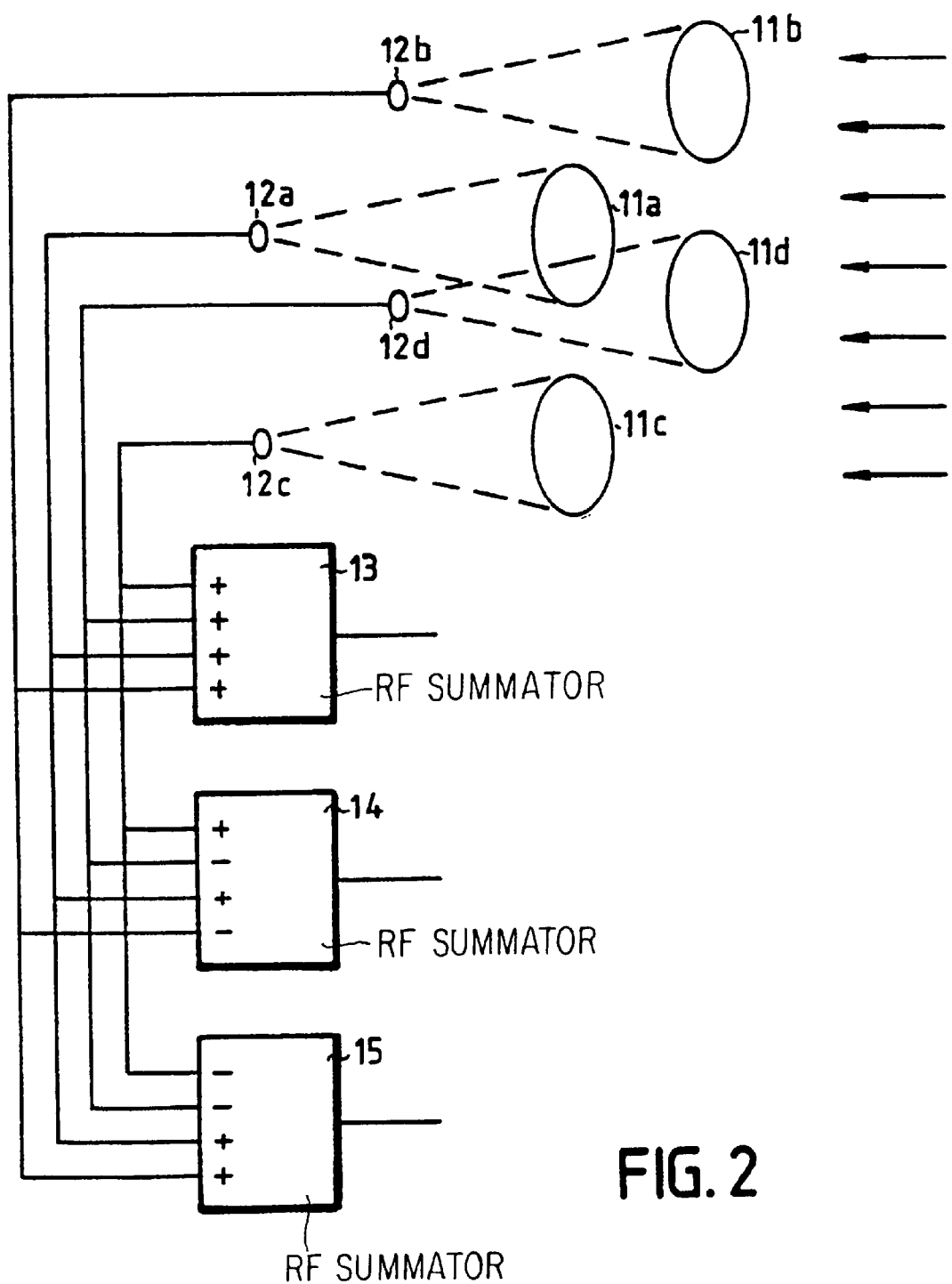
FIG. 2 represents an optical monopulse detector according to the invention.

FIG. 2 represents a monopulse version of the optical detector according to the invention. By means of four lenses 11a, 11b, 11c, 11d, incoming optical echo signals are focused on to four detectors 12a, 12b, 12c and 12d. It is self-evident that obliquely incident radiation will give rise to phase or amplitude differences in the detector RF output signals. Fully analogous to the known RF monopulse antenna, the output signals of the detectors 12a, 12b, 12c, 12d are in RF summator 13 combined to produce a sum signal, in RF summator 14 to produce a Δ-azimuth difference signal and in RF summator 15 to produce a Δ-elevation difference signal, which RF signals may be applied for further processing to a monopulse receiver, well-known in the art. The advantage of the monopulse version of an optical detector is that for a detected target the position of the target within the transmitted beam is instantaneously known.

I claim:

1. A detection arrangement for detecting remote targets, comprising:

a radar signal generator generating coded RF radar signals;

an optical signal generator including an optical modulator providing modulated output optical signals responsive to the coded RF radar signals received from the radar signal generator and a light beam received from a light source;

an optical detector receiving reflected modulated output optical signals as echo signals from the remote targets and converting the echo signals into RF target signals;

a radar receiver receiving the RF target signals from the optical detector and providing output video signals responsive thereto; and a video processor receiving the output video signals from the radar receiver and processing the output video signals to enable detection of moving remote targets by using moving target indication (MTI) processing or moving target detection (MTD) processing.

2. A detection arrangement as claimed in claim 1, wherein the optical modulator provides amplitude modulated output optical signals.

3. A detection arrangement as claimed in claim 2, wherein the optical detector is an envelope detector.

4. A detection arrangement as claimed in claim 1, wherein the radar signal generator generates the coded RF radar signals as pulse bursts.

5. A detection arrangement as claimed in claim 1, wherein the radar signal generator generates FMCW radar signals as the coded RF radar signals and the radar receiver comprises a mixer stage for combining the RF target signals from the optical detector with the FMCW radar signals.

6. A detection arrangement as claimed in claim 1, wherein the optical detector incorporates at least two optical diodes for producing RF monopulse radar signals as the RF target signals and the radar receiver unit is a monopulse radar receiver.

7. A detection arrangement as claimed in claim 6, wherein the optical detector incorporates four optical diodes for producing a radar sum signal, a Δ-azimuth difference signal and a Δ-elevation difference signal.

* * * * *